(12) United States Patent
Zhu

(10) Patent No.: US 12,010,065 B2
(45) Date of Patent: Jun. 11, 2024

(54) METHOD FOR TRANSMITTING HARQ FEEDBACK INFORMATION, TERMINAL, AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 695 days.

(21) Appl. No.: 17/260,981

(22) PCT Filed: Jul. 25, 2018

(86) PCT No.: PCT/CN2018/097100
§ 371 (c)(1),
(2) Date: Jan. 15, 2021

(87) PCT Pub. No.: WO2020/019215
PCT Pub. Date: Jan. 30, 2020

(65) Prior Publication Data
US 2021/0297222 A1   Sep. 23, 2021

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ........................... H04L 1/1812; H04L 5/0055
See application file for complete search history.

(56) References Cited

U.S. PATENT DOCUMENTS

2014/0204878 A1   7/2014  Jang et al.
2017/0201932 A1*  7/2017  Yeh ...................... H04L 5/0055

FOREIGN PATENT DOCUMENTS

CN    103181109 A    6/2013
CN    103312468 A    9/2013
(Continued)

OTHER PUBLICATIONS

International Search Report issued in International Application No. PCT/CN2018/097100 dated Mar. 18, 2019 with English translation, (4p).

(Continued)

*Primary Examiner* — Brian P Cox
(74) *Attorney, Agent, or Firm* — Arch & Lake LLP

(57) ABSTRACT

The present disclosure provides a method for transmitting hybrid automatic repeat request (HARQ) feedback information, a terminal, and a base station. The method applied in the terminal includes: acquiring preset downlink HARQ configuration information, and the preset downlink HARQ configuration information is used for informing a terminal of transmission characteristics for target downlink control signaling, and the target downlink control signaling is used for bearing HARQ feedback information for at least two uplink data transmissions of any terminal; determining feature information of the target downlink control signaling according to the preset downlink HARQ configuration information; acquiring the target downlink control signaling of the terminal according to the feature information; and parsing the target downlink control signaling to obtain HARQ feedback information for at least two uplink data transmissions.

18 Claims, 9 Drawing Sheets

(56) References Cited

FOREIGN PATENT DOCUMENTS

| | | | |
|---|---|---|---|
| CN | 103368709 A | 10/2013 | |
| CN | 104125045 A | 10/2014 | |
| CN | 105634689 A | 6/2016 | |
| WO | WO-2016070790 A1 * | 5/2016 | ............... H04L 1/18 |
| WO | 2016162090 A1 | 10/2016 | |
| WO | 2018082059 A1 | 5/2018 | |
| WO | 2018098778 A1 | 6/2018 | |

OTHER PUBLICATIONS

First Office Action issued to Chinese Application No. 201880001487.1 dated Sep. 2, 2020 with English translation, (19p).

* cited by examiner

METHOD FOR TRANSMITTING HARQ FEEDBACK INFORMATION, TERMINAL, AND BASE STATION

CROSS-REFERENCE TO RELATED APPLICATIONS

This application is the national phase application of PCT Application No. PCT/CN2018/097100, filed Jul. 25, 2018, the entire content of which is incorporated herein by reference for all purposes.

TECHNICAL FIELD

The present disclosure relates to the field of communication technologies, and in particular, to a method for transmitting Hybrid Automatic Repeat reQuest (HARQ) feedback information, a terminal and a base station.

BACKGROUND

In a wireless communication system, due to an influence of time-varying characteristics and a multipath fading of a wireless channel, signal transmission will be affected and data transmission will fail. In view of this matter, the wireless communication system introduces a HARQ mechanism, in which whether data is received correctly or not is fed back by HARQ feedback information (that is, an ACK signal or a NACK signal) from a receiving end; a sending end decides whether it is necessary to resend a data packet that has been sent according to the above HARQ feedback information. In a traditional LTE (Long Term Evolution) system, there is a timing relationship between time points of the data transmission and an ACK/NACK feedback. Limited by processing capabilities of a terminal, there is at least 4 ms between the time point of the data transmission and the time point of the ACK/NACK feedback in the LTE system.

With developments of wireless communication technologies, mobile communication networks have gradually evolved to 5G NR (New Radio) networks. The new generation of communication networks can support a flexible HARQ feedback mechanism. For a HARQ feedback of uplink data transmission, a base station can indicate whether it is necessary to retransmit the uplink data that has been transmitted by a scheduling instruction. However, since each HARQ feedback is carried by one scheduling signaling, signaling overhead is relatively large. In addition, for a communication system operating on an unlicensed spectrum, due to uncertainty of channel occupied, the base station may transmit the HARQ feedback information for multiple uplink data transmissions of one terminal on a same transmission unit. In this case, it is not appropriate to use a separate scheduling signaling to carry each piece of HARQ feedback information.

SUMMARY

Embodiments of the present disclosure provide a method for transmitting HARQ feedback information, a terminal, and a base station. The base station can transmit, through a target downlink control signaling, HARQ feedback information for multiple uplink data transmissions of one terminal, thereby saving system signaling overhead.

According to a first aspect of the present disclosure, there is provided a method for transmitting downlink HARQ feedback information, which is applied to a terminal, and the method includes: acquiring preset downlink HARQ configuration information, where the preset downlink HARQ configuration information is used for informing the terminal of transmission characteristics of a target downlink control signaling, and the target downlink control signaling is used for bearing HARQ feedback information for at least two uplink data transmissions of any terminal. The method further includes: determining feature information of the target downlink control signaling according to the preset downlink HARQ configuration information; acquiring the target downlink control signaling of the terminal according to the feature information; and parsing the target downlink control signaling to obtain the HARQ feedback information for the at least two uplink data transmissions.

According to a second aspect of the present disclosure, there is provided a method for transmitting downlink HARQ feedback information, which is applied to a base station, and the method includes: determining preset downlink HARQ configuration information, where the preset downlink HARQ configuration information is used for informing a terminal of transmission characteristics of a target downlink control signaling, and the target downlink control signaling is used for bearing HARQ feedback information for at least two uplink data transmissions of one terminal; and loading the HARQ feedback information into the target downlink control signaling according to the preset downlink HARQ configuration information, and sending it to the terminal.

According to a third aspect of the present disclosure, there is provided a terminal. The terminal includes a processor, and a memory for storing instructions executable by the processor. The processor is configured to: acquire preset downlink HARQ configuration information, wherein the preset downlink HARQ configuration information is used for informing the terminal of transmission characteristics of a target downlink control signaling, and the target downlink control signaling is used for bearing HARQ feedback information for at least two uplink data transmissions of any terminal; determine feature information of the target downlink control signaling according to the preset downlink HARQ configuration information; acquire the target downlink control signaling of the terminal according to the feature information; and parse the target downlink control signaling to obtain the HARQ feedback information for the at least two uplink data transmissions.

According to a fourth aspect of the present disclosure, there is provided a base station. The base station includes a processor, and a memory for storing instructions executable by the processor. The processor is configured to: determine preset downlink HARQ configuration information, wherein the preset downlink HARQ configuration information is used for informing a terminal of transmission characteristics of a target downlink control signaling, and the target downlink control signaling is used for bearing HARQ feedback information for at least two uplink data transmissions of any terminal; and load the HARQ feedback information into the target downlink control signaling according to the preset downlink HARQ configuration information, and send the target downlink control signaling to the terminal.

According to a fifth aspect of the embodiments of the present disclosure, there is provided a non-transitory computer-readable storage medium having computer instructions stored thereon, which, when executed by a processor, implement steps of any of the methods described in the first aspect.

According to a sixth aspect of the embodiments of the present disclosure, there is provided a non-transitory computer-readable storage medium having computer instructions stored thereon, which when executed by a processor, implement steps of any of the methods described in the second aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the present invention as detailed in the appended claims.

The terms used in the present disclosure are merely for the purpose of describing particular embodiments and are not intended to limit the present disclosure. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the indication information may also be referred to as the second information, and similarly, the second information may also be referred to as the indication information. Depending on the context, the word "if" as used herein can be interpreted as "upon" or "when" or "in response to determination".

Executive bodies involved in the present disclosure include: a base station and a terminal. The base stations may be a base station and a sub-base station provided with a large-scale antenna array. The terminal may be user equipment (UE), a user node, a mobile terminal or a tablet computer, etc. In the specific implementation process, the base station and the terminal are independent and communicate with each other to jointly implement the technical solutions provided by the present disclosure.

Figure 1:
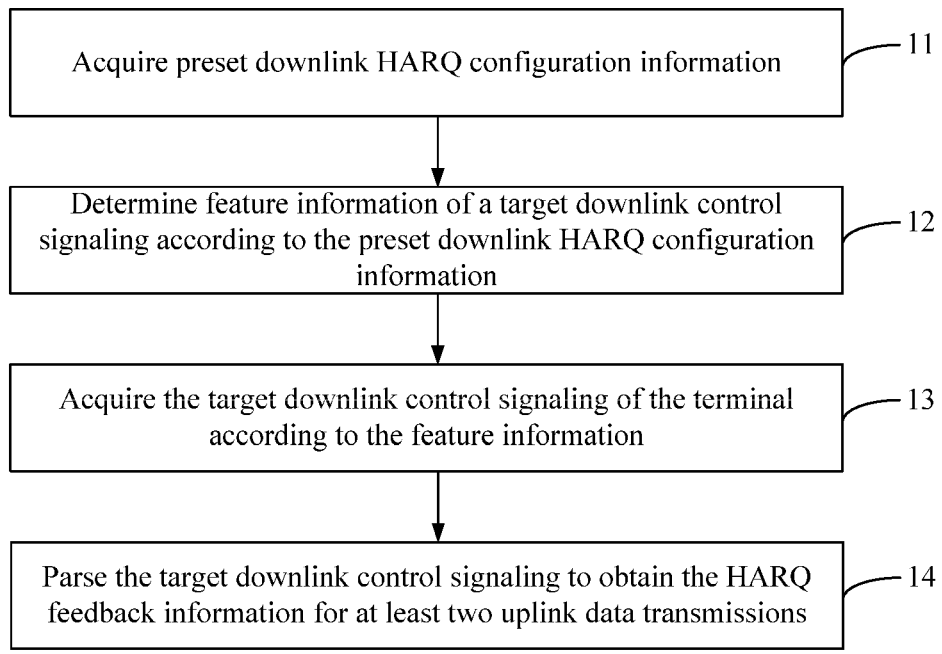
FIG. 1 is a flowchart showing a method for transmitting HARQ feedback information according to an exemplary embodiment of the present disclosure.

FIG. 1 is a flowchart showing a method for transmitting HARQ feedback information according to an exemplary embodiment, which is applied to a terminal. Referring to FIG. 1, the method can include the following steps.

In step 11, preset downlink HARQ configuration information is acquired. The preset downlink HARQ configuration information is used for informing the terminal of transmission characteristics of a target downlink control signaling, and the target downlink signaling is used for bearing HARQ feedback information for at least two uplink data transmissions of any terminal.

In the present disclosure, the terminal can acquire the preset downlink HARQ configuration information in the following manners.

Manner 1: if the preset downlink HARQ configuration information is specified by a system protocol, the preset downlink HARQ configuration information may be information preset in the terminal by an operator or a terminal equipment manufacturer when the terminal is shipped or initialized.

Manner 2: the terminal can receive the preset downlink HARQ configuration information issued by the base station. That is, the preset downlink HARQ configuration information may be sent to the terminal by the base station.

The terminal can acquire the preset downlink HARQ configuration information at moments described below.

In an embodiment, the terminal acquires the preset downlink HARQ configuration information from system information broadcast by a base station upon accessing a cell network, that is, the base station sent the preset downlink HARQ configuration information to the terminal in a broadcast manner. Alternatively, the base station sent the preset downlink HARQ configuration information to the terminal in a unicast manner.

In another embodiment, the terminal can acquire the preset downlink HARQ configuration information from the base station before preparing to send multiple uplink data transmissions to the base station.

For example, the terminal can actively request the base station to send the preset downlink HARQ configuration information. Alternatively, for example, when identifying that the terminal accessed a cell for the first time, the base station can actively send the preset downlink HARQ configuration information to the terminal according to the related art. The present disclosure does not limit the manner through which the terminal acquires the downlink HARQ configuration information.

In an embodiment of the present disclosure, the base station can customize the preset downlink HARQ configuration information for a current terminal based on an ability of the current terminal for supporting HARQ processes.

Figure 2:
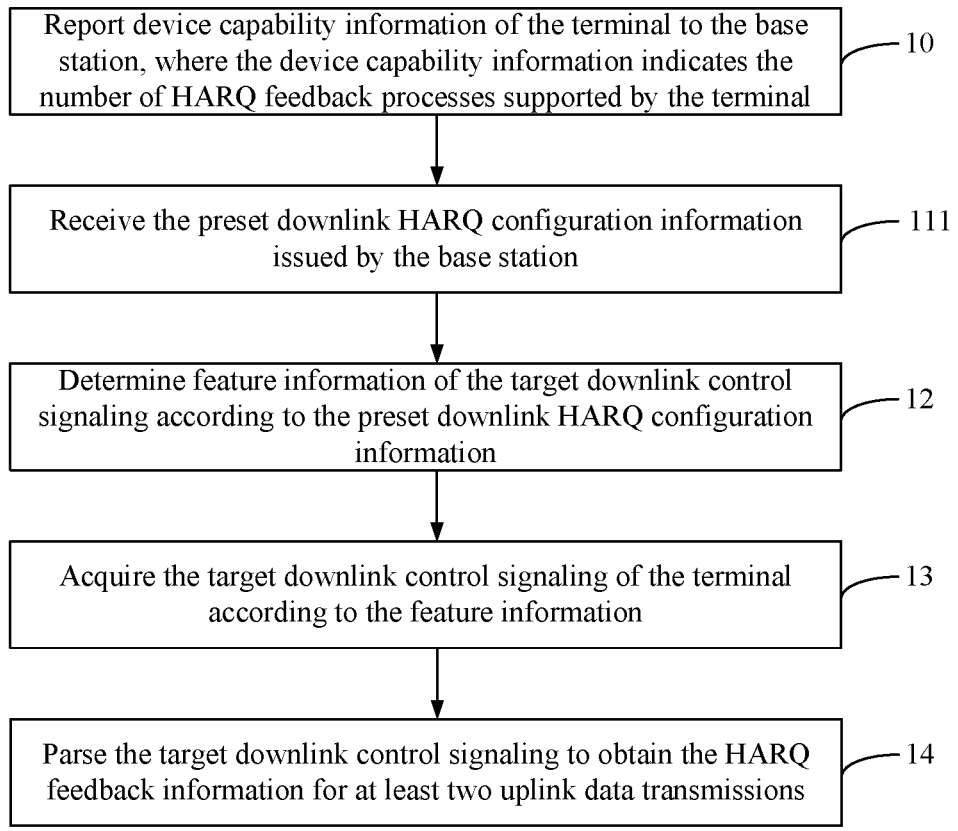
FIG. 2 is a flowchart showing another method for transmitting HARQ feedback information according to an exemplary embodiment of the present disclosure.

In view of this situation, referring to FIG. 2 which is a flowchart showing another method for transmitting HARQ feedback information according to an exemplary embodiment, step 11 may be implemented as step 111.

In step 111, the preset downlink HARQ configuration information issued by the base station is received.

Before step 111, the method may further include:

In step 10, device capability information of the terminal is reported to the base station, and the device capability information indicates the number of HARQ feedback processes supported by the terminal, so that the base station determines the downlink HARQ configuration information according to the number of HARQ feedback processes supported by the terminal.

Regarding a trigger mechanism for reporting the device capability information, the terminal may actively report the device capability information to the base station when accessing a cell network covered by the base station, or the terminal may passively report the device capability information as requested by the base station, which is not limited by the present disclosure.

In the embodiments of the present disclosure, if the number of HARQ processes currently supported by terminal UE1 is 4, the device capability information reported by UE1 is used for informing the base station that the maximum number of HARQ processes currently supported by UE1 is 4. Then, the base station may set the information bit length of the target downlink control signaling as 4 bits according to the device capability information of UE1, and notify UE1 of the preset information bit length through the preset downlink HARQ configuration information.

In step 12, feature information of the target downlink control signaling is determined according to the preset downlink HARQ configuration information.

In the embodiments of the present disclosure, the preset downlink HARQ configuration information at least includes: the feature information of the target downlink control signaling. After acquiring the feature information, the terminal may determine the target downlink control signaling from the downlink information sent from the base station according to the feature information.

In the embodiments of the present disclosure, the feature information used for determining the target downlink control signaling may include at least one of the following:

preset bit length information for downlink HARQ feedback information of the terminal;

preset flag information corresponding to the target downlink control signaling; and transmission characteristics information of the target downlink control signaling.

The transmission characteristics information of the target downlink control signaling may include: a preset time-frequency position, a preset HARQ-RNTI (Radio Network Temporary Identifier) value; and a preset scrambling sequence.

In step 13, the target downlink control signaling of the terminal is acquired according to the feature information.

In the present disclosure, after completing multiple uplink data transmissions, the terminal can monitor the target downlink control signaling that the base station issues at the preset time-frequency position by using the feature information of the target downlink control signaling. The target downlink control signaling is specifically used for bearing the HARQ feedback information for the multiple uplink data transmissions.

In the present disclosure, according to different target downlink control signaling feature information, the terminal can detect the target downlink control signaling thereof in at least one of the following manners.

Figure 3:
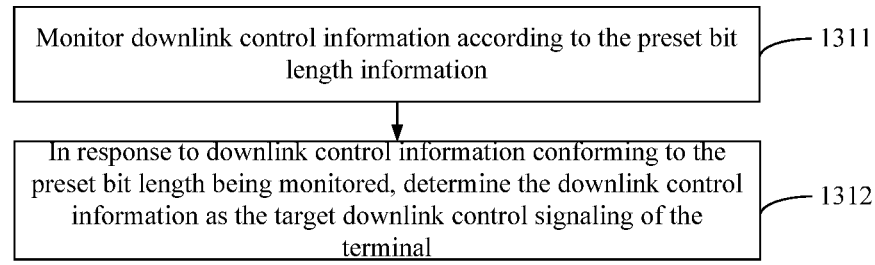
FIG. 3 is a flowchart showing another method for transmitting HARQ feedback information according to an exemplary embodiment of the present disclosure.

Manner 1: if the feature information of the target downlink control signaling is the preset bit length information for downlink HARQ feedback information of the terminal (the preset bit length may be a preset bit length specified by a protocol, or length information that is fixedly configured by the base station according to the capabilities of the current terminal or configured in a timely manner), referring to FIG. 3 which is a flowchart showing another method for transmitting HARQ feedback information according to an exemplary embodiment, step 13 may include step described below.

In step 1311, downlink control information is monitored according to the preset bit length information.

Still taking the terminal UE1 as an example, assuming that UE1 determines the feature information of the target downlink control signaling is N bits from the preset downlink HARQ configuration information issued by the base station, UE1 determines the maximum number of blind checks for a PDCCH (Physical Downlink Control Channel) according to the preset bit length information N, and monitors DCI (Downlink Control Information) with the preset bit length N on the PDCCH.

In step 1312, if downlink control information conforming to the preset bit length is detected, the downlink control information is determined as the target downlink control signaling of the terminal.

If the DCI conforming to the preset bit length N is detected by the terminal, the currently detected DCI with information bit length N is determined as the target downlink control signaling.

The embodiments of the present disclosure are applicable to application scenarios where signaling for bearing the HARQ feedback information used by individual terminals has different lengths, that is, the target downlink control signaling can be clearly identified by the preset bit length, and the target downlink control signaling for the terminal can be easily and quickly identified by using the preset bit length information for downlink HARQ feedback information of the terminal.

Manner 2: it is suitable for scenarios where the information bit length of the target downlink control signaling is same as the information bit length of other types of DCI.

Figure 4:
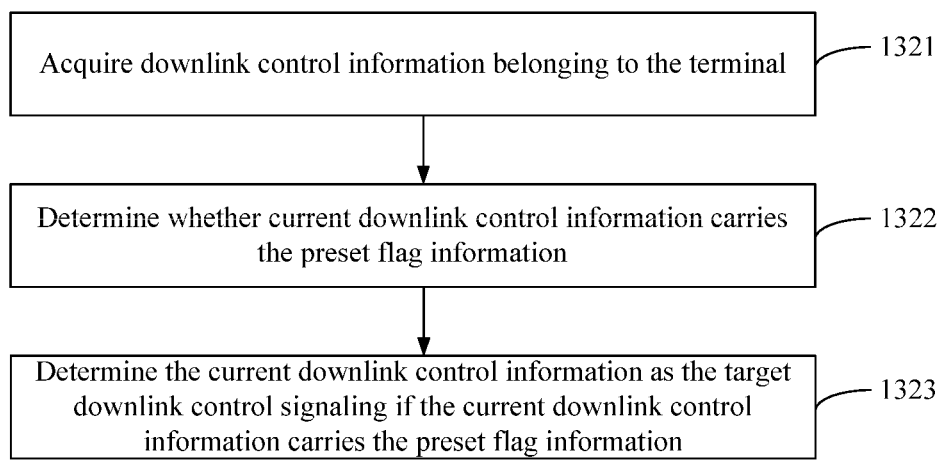
FIG. 4 is a flowchart showing another method for transmitting HARQ feedback information according to an exemplary embodiment of the present disclosure.

If the feature information of the target downlink control signaling configured by the system or the base station is the preset flag information, referring to FIG. 4 which is a flowchart showing another method for transmitting HARQ feedback information according to an exemplary embodiment, step 13 may include steps described below.

In step 1321, downlink control information belonging to the terminal is acquired.

According to related knowledge, the terminal detects its own DCI from the PDCCH according to the maximum number of blind checks, such as 44.

In step 1322, it is determined whether the preset flag information is carried in the current downlink control information.

If one or more DCIs belonging to oneself are detected, it is determined whether each DCI conforming the target information bit length carries the preset flag information. The preset flag information is used for identifying that the current DCI belongs to the target DCI for bearing the HARQ feedback information of the uplink data transmission. If the preset flag information is not detected in the current DCI, it is determined that the current DCI is not the target downlink control signaling; otherwise, the following step 1323 is performed.

In step 1323, if the preset flag information is carried in the current downlink control information, the current downlink control information is determined as the target downlink control signaling.

Manner 3: the target downlink control signaling is detected according to the transmission characteristics information of the target downlink control signaling.

Depending on different transmission characteristics information, step 13 may be performed through at least one implementation described below.

A first implementation corresponds to a situation where the transmission characteristics information is the preset time-frequency position for transmitting the target downlink control signaling.

In this case, step 13 may include the following step: if the terminal detects the downlink control information belonging to its own at the preset time-frequency position of the transmission unit, the downlink control information is determined as the target downlink control signaling.

In the embodiments of the present disclosure, the base station or the system agrees to set the target downlink control signaling at the preset time-frequency position of one or more downlink transmission units. Assuming that the transmission unit is a slot, it can be agreed to bear the target downlink control signaling at a preset time-frequency position of a control region of the slot. In the present disclosure, the transmission unit may be a time domain resource unit such as a slot, a mini-slot, and a symbol, which is not limited in the present disclosure.

When the terminal detects its own DCI at a preset time-frequency position of a control region of a downlink transmission unit, the DCI may be determined as the target downlink control signaling.

A second implementation corresponds to a situation where the transmission characteristics information is the preset HARQ-RNTI value.

In this case, step 13 may include the following step: if the terminal successfully detects its own DCI by using the preset HARQ-RNTI value, the DCI is determined as the target downlink control signaling.

In the embodiments of the present disclosure, the base station or system agrees to use the preset HARQ-RNTI value to identify the target downlink control signaling. When the HARQ feedback information for the multiple uplink data transmissions is sent through the target downlink control signaling, the HARQ-RNTI value is loaded into the target downlink control signaling for the terminal.

Correspondingly, if the terminal detects that the RNTI (Radio Network Temporary Identity) value in the DCI is the same as the preset HARQ-RNTI value while monitoring the DCI, the DCI is determined as the target downlink control signaling.

A third implementation corresponds to a situation where the transmission characteristics information is the preset scrambling code.

In this case, step 13 may include the following step: if the terminal descrambled a cyclic redundancy check (CRC) of the detected downlink control information successfully with the preset scrambling code, it is determined that the DCI belongs to the target downlink control signaling.

In the embodiments of the present disclosure, the base station or system agrees to use the preset scrambling code to scramble a preset information field of the target downlink control signaling, so as to identify that the downlink control information belongs to the target downlink control signaling. Exemplarily, the preset information field may be the CRC or a preset field of the DCI information domain.

Correspondingly, after the terminal detects its own DCI, the DCI has scrambled information. If the terminal successfully descrambles the scrambled part of the information with the preset scrambling code, it is determined that the DCI belongs to the target downlink control signaling.

It should be noted that the terminal can detect the target downlink control signaling by a combination of multiple detection manners described above. For example, when multiple candidate DCIs are detected simultaneously by the terminal according to the preset bit length information, the target downlink control signaling may be further identified according to the preset flag information and/or the transmission characteristics information. It is not limited in the present disclosure that only one manner is used for identifying the target downlink control signaling.

In step 14, the target downlink control signaling is parsed to obtain the HARQ feedback information for at least two uplink data transmissions.

Figure 5:
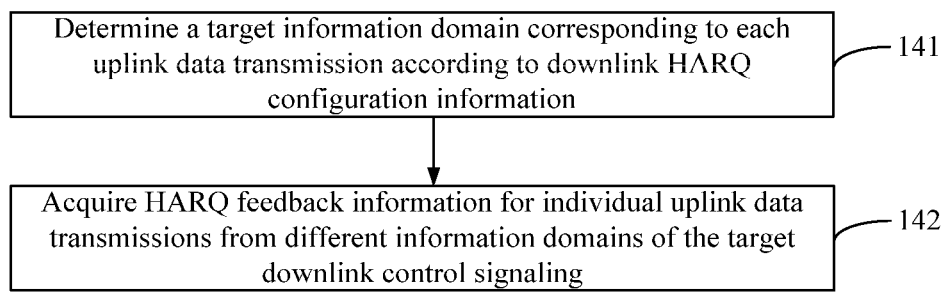
FIG. 5 is a flowchart showing another method for transmitting HARQ feedback information according to an exemplary embodiment of the present disclosure.

Referring to FIG. 5 which is a flowchart showing another method for transmitting HARQ feedback information according to an exemplary embodiment, step 14 may include steps described below.

In step 141, a target information domain corresponding to each uplink data transmission is determined according to the downlink HARQ configuration information. The target information domain is used for bearing HARQ feedback information for one preset uplink data transmission.

The implementation of this step can include two situations.

In a first situation, the system protocol specifies bearing positions in the target downlink signaling of the HARQ feedback information for different uplink data transmissions. For example, for three uplink data transmissions in chronological sequence, their HARQ feedback information is respectively set in a first, second, and third information bits of the target downlink control signaling. In other words, the HARQ feedback information for the first uplink data transmission that is completed earliest is beard in the first bit of the target downlink control signaling.

In this situation, the system can bear the HARQ feedback information of each uplink data transmission according to a time sequence by default, and no signaling overhead is spent to inform the terminal of the bearing location of the HRAQ feedback information.

In a second situation, the terminal acquires the transmission configuration information of the HRAQ feedback information issued by the base station.

Figure 6:
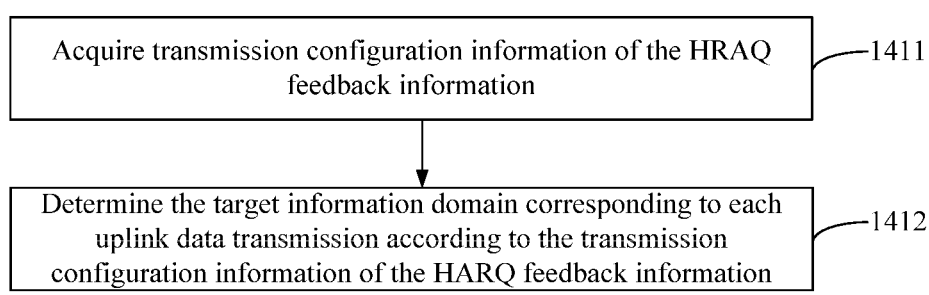
FIG. 6 is a flowchart showing another method for transmitting HARQ feedback information according to an exemplary embodiment of the present disclosure.

Referring to FIG. 6 which is a flowchart showing another method for transmitting HARQ feedback information according to an exemplary embodiment, step 141 may include steps described below.

In step 1411, transmission configuration information of the HRAQ feedback information is acquired. The transmission configuration information of the HARQ feedback information is used for informing the terminal of bearing positions, in the target downlink control signaling, of the HARQ feedback information for the at least two uplink data transmissions.

In the present disclosure, the base station may send the transmission configuration information of the HRAQ feedback information to the terminal through a separate signaling, or send the transmission configuration information of the HRAQ feedback information and the feature information of the target downlink control signaling to the terminal through the same signaling.

In step 1412, the target information domain corresponding to each uplink data transmission is determined according to the transmission configuration information of the HARQ feedback information.

The applicable scenarios of the embodiments of the present disclosure may be: delay sensitivities of individual uplink data transmissions completed by the terminal are different. Depending on the delay sensitivities of different data transmissions, the base station can preferentially set the HARQ feedback information for the uplink data transmission with higher delay requirements in preamble information bits, so that the terminal can parse out the HARQ feedback information for the delay-sensitive uplink data transmission earlier to meet different service requirements.

In step 142, HARQ feedback information for individual uplink data transmissions is acquired from different information domains of the target downlink control signaling.

After determining the target information domain corresponding to the uplink data transmissions of different timings, the terminal accurately parses out the HARQ feedback information for each uplink data transmission from the corresponding information domain.

In summary, by adopting the method for transmitting HARQ feedback information provided by the present disclosure, the terminal can acquire the HARQ feedback information for multiple finished uplink data transmissions from a target downlink control signaling at one time. Compared with the related art, the method for transmitting HARQ feedback information provided by the present disclosure can avoid parsing multiple scheduling signalings, thereby improving parsing efficiency of the HARQ feedback information and saving the signaling overheads of the system.

Correspondingly, the present disclosure further provides a method for transmitting downlink HARQ feedback information, which can be applied to a base station of the 5G NR system.

Figure 7:
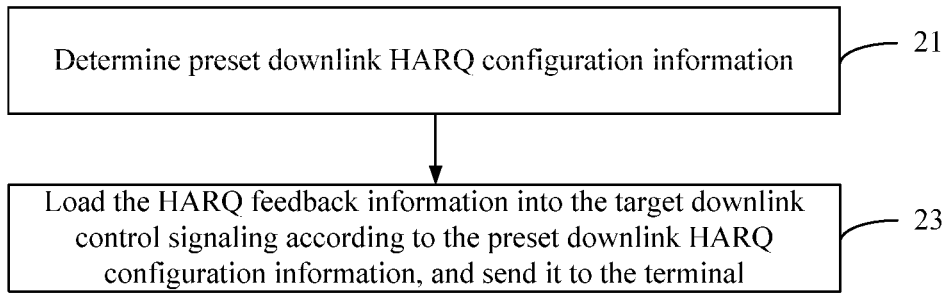
FIG. 7 is a flowchart showing another method for transmitting HARQ feedback information according to an exemplary embodiment of the present disclosure.

Referring to FIG. 7 which is a flowchart showing a method for transmitting HARQ feedback information according to an exemplary embodiment, the method may include steps described below.

In step 21, preset downlink HARQ configuration information is determined. The preset downlink HARQ configuration information is used for informing a terminal of transmission characteristics of a target downlink control signaling, and the target downlink control signaling is used for bearing HARQ feedback information for at least two uplink data transmissions of any terminal.

In the present disclosure, the preset downlink HARQ configuration information is configuration information determined for a preset HARQ feedback mechanism. According to the HARQ feedback mechanism, one target downlink control signaling is used to feed back the HARQ feedback information for multiple uplink data transmissions to the terminal at one time. In the present disclosure, each uplink data transmission corresponds to one piece of HARQ feedback information.

In an embodiment of the present disclosure, the base station may enable the preset HARQ feedback mechanism under a preset trigger condition. The preset trigger condition may be: it is detected by the base station that the terminal performed the multiple uplink data transmissions through unlicensed frequency band resources. In another embodiment of the present disclosure, the preset trigger condition may be: multiple uplink data transmissions of one terminal are detected by the base station within a preset time range.

In another embodiment of the present disclosure, the base station may adopt the above HARQ feedback mechanism by default.

In the present disclosure, the preset downlink HARQ configuration information may include feature information of the target downlink control signaling. The feature information is used for informing the terminal how to identify the target downlink control signaling.

In an embodiment of the present disclosure, the feature information of the target downlink control signaling may include at least one of the following:

preset bit length information for downlink HARQ feedback information of the terminal;

preset flag information used for identifying the target downlink control signaling; and transmission characteristics information of the target downlink control signaling. The transmission characteristics information includes at least one of the following:

a preset time-frequency position for transmitting the target downlink control signaling;

a preset HARQ-RNTI value; and a preset scrambling sequence of the target downlink control signaling.

In an embodiment of the present disclosure, the feature information of the target downlink control signaling is the preset bit length information for downlink HARQ feedback information of the terminal. The preset bit length information may be fixed information randomly designated by the base station for the terminal, such as 5 bits. In another embodiment of the present disclosure, the base station may dynamically configure length information for the terminal according to the ability of the terminal to currently support the HARQ feedback processes.

Figure 8:
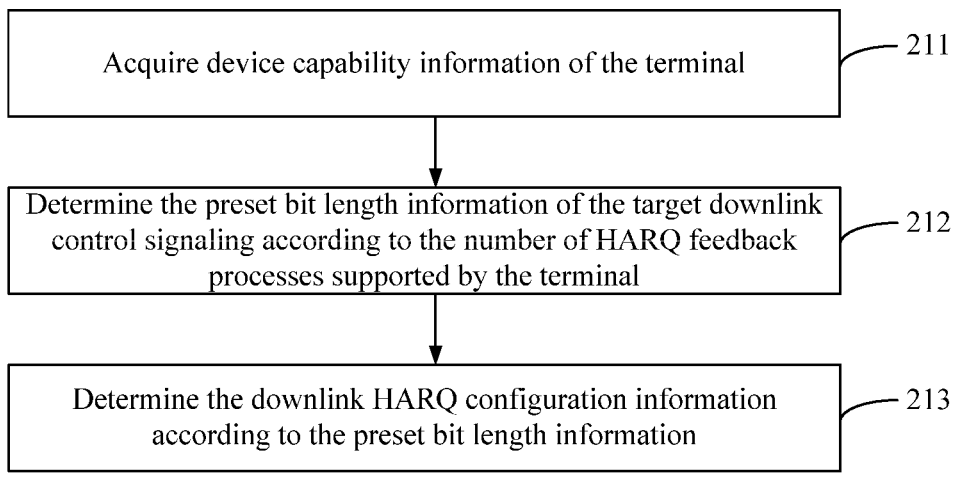
FIG. 8 is a flowchart showing another method for transmitting HARQ feedback information according to an exemplary embodiment of the present disclosure.

Referring to FIG. 8 which is a flowchart showing another method for transmitting HARQ feedback information according to an exemplary embodiment, step 21 may include steps described below.

In step 211, device capability information of the terminal is acquired, and the device capability information indicates the number of HARQ feedback processes supported by the terminal;

This step corresponds to the above step 10, and for a specific implementation process, please refer to the description of the above step 10, which will not be repeated here. The ability of the terminal to support the HARQ feedback process may be fixedly configured, or configured in a timely manner. In the present disclosure, the ability of the terminal to support the HARQ feedback process can be expressed as the maximum number of HARQ feedback processes supported by the terminal.

In step 212, the preset bit length information of the target downlink control signaling is determined according to the number of HARQ feedback processes supported by the terminal.

The preset bit length may not be less than the number of HARQ feedback processes supported by the terminal. For example, if the terminal can currently support a maximum of 4 HARQ feedback processes, the preset bit length information may not be less than 4 bits, such as 5 bits.

In step 213, the downlink HARQ configuration information is determined according to the preset bit length information.

Figure 9:
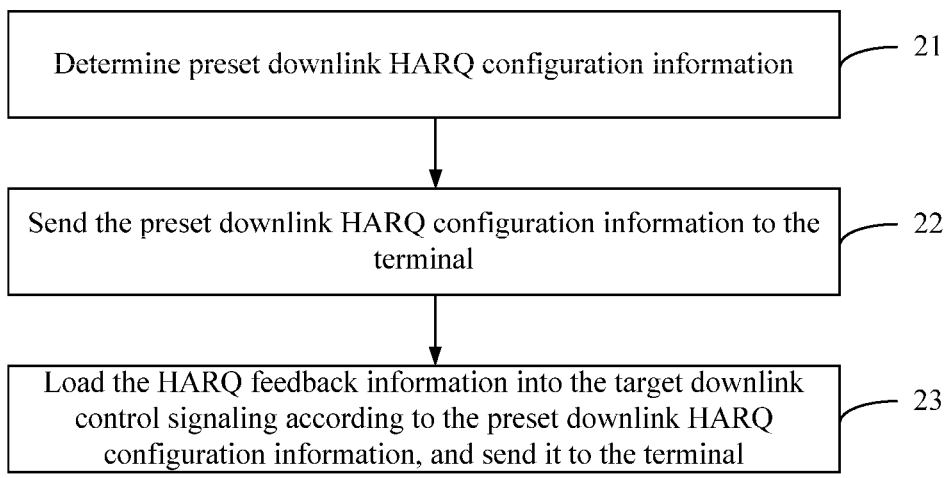
FIG. 9 is a flowchart showing another method for transmitting HARQ feedback information according to an exemplary embodiment of the present disclosure.

Referring to FIG. 9 which is a flowchart showing another method for transmitting HARQ feedback information according to an exemplary embodiment, after the above step 21, the method may further include step 22.

In step 22, the preset downlink HARQ configuration information is sent to the terminal, so that the terminal learns the target downlink control signaling according to the preset downlink HARQ configuration information.

This embodiment corresponds to the embodiment shown in FIG. 2, and the specific implementation process can be referred to each other. The base station may send the preset downlink HARQ configuration information to the terminal through any of the following signaling: a broadcast signaling, a higher layer signaling, or a PDCCH (Physical Downlink Control Channel) signaling of a physical layer. The higher layer signaling may be a RRC (Radio Resource Control) signaling, a MAC (Medium Access Control) CE (Control Element) signaling.

In step 23, the HARQ feedback information is loaded into the target downlink control signaling according to the preset downlink HARQ configuration information, and sent to the terminal.

Assuming that the base station needs to feed back the HARQ information for 4 uplink data transmissions completed by the terminal, the base station can load the HARQ feedback information into the target downlink control signaling in at least one of the manners described below, and send it to the terminal.

Manner 1: the four pieces of HARQ feedback information are loaded into the target downlink control signaling with a length of 5 bits.

Manner 2: the four pieces of HARQ feedback information are loaded into a fixed-length DCI, which is also a length of other types of DCI; then, a preset flag information is added to the preset information domain of the DCI, and the preset flag information is used for indicating that the current DCI belongs to a dedicated signaling bearing the HARQ feedback information.

Manner 3: after the four pieces of HARQ feedback information are loaded into one DCI, the at least one type of transmission characteristics information can also be set, for example, using the preset scrambling sequence to scramble a preset information field of the DCI; Or, the preset HARQ-RNTI value for the terminal is add to the DCI; or, the DCI is loaded into a resource at the preset time-frequency position of the control region and sent to the terminal.

Regarding an order in which the base station loads the HARQ feedback information in the target downlink control signaling, in an embodiment of the present disclosure, the base station can load the HARQ feedback information in sequence into the information domain of the target control signaling according to a completion timing of each uplink data transmission.

For example, assuming that there are 4 uplink data transmissions, which correspond to HARQ process 1, HARQ process 2, HARQ process 3, and HARQ process 4, respectively, and a first, second, third and fourth bits in the DCI are used for bearing the HARQ feedback information for each of the above processes, then a correspondence between the HARQ process and the bearing position can be as shown in Table 1.

TABLE 1

| HARQ process number | bearing position identification |
|---|---|
| HARQ process 1 | first bit |
| HARQ process 2 | second bit |
| HARQ process 3 | third bit |
| HARQ process 4 | fourth bit |

Figure 10A:
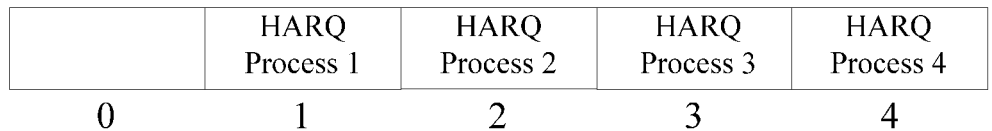
FIG. 10A is a schematic diagram showing an application scenario for transmitting HARQ feedback information according to an exemplary embodiment of the present disclosure.

The loaded target downlink control signaling can be as shown in FIG. 10A, where the 0th bit can be used for recording the preset flag information.

In another embodiment of the present disclosure, in consideration of the delay-sensitive characteristics of different uplink data transmission services, the base station can comprehensively consider the data transmission chronological order and service sensitivity, and set the HARQ feedback information of delay-sensitive service, such as eMBB (enhanced Mobile Broad Band) service, in a front position.

For example, assuming that the HARQ process 4 corresponds to a delay-sensitive service, the base station can set its feedback information to the first bit. Further, if the other three uplink data transmission services have the same and inferior delay sensitivity, such as mMTC (massive machine type communication) service, the target information domains can be set according to the chronological order. Exemplarily, in the embodiments of the present disclosure, a correspondence between the HARQ process and the bearing position can be as shown in Table 2.

TABLE 2

| HARQ process number | bearing position identification |
|---|---|
| HARQ process 1 | first bit |
| HARQ process 2 | second bit |
| HARQ process 3 | third bit |
| HARQ process 4 | fourth bit |

Figure 10B:
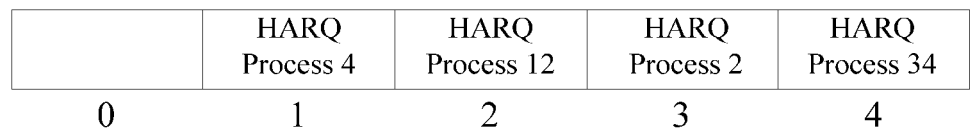
FIG. 10B is a schematic diagram showing another application scenario for transmitting HARQ feedback information according to an exemplary embodiment of the present disclosure.

Correspondingly, the base station may generate the transmission configuration information of the HARQ feedback information according to Table 2, and send the transmission configuration information to the terminal. Afterwards, according to the transmission configuration information, the HARQ feedback information for the at least two uplink data transmissions is loaded into the designated information domain of the target downlink control signaling. As for the above example, the loaded target downlink control signaling can be as shown in FIG. 10B.

In the embodiments of the present disclosure, to meet different service requirements as much as possible and improve the user experience of the 5G NR network, the base station can determine the bearing positions of different HARQ feedback information based on the chronological order of different uplink data transmissions and the delay sensitivity of the services beard on the uplink data transmissions.

For the foregoing method embodiments, for the sake of simple description, they are all expressed as a series of action combinations, but those skilled in the art should know that the present disclosure is not limited by the described sequence of actions, because in the present disclosure, certain steps may be performed in other order or simultaneously.

Secondly, those skilled in the art should also be aware that the embodiments described in the specification are optional embodiments, and the actions and modules involved are not necessarily required by the present disclosure.

Corresponding to the application function realization method embodiments described above, the present disclosure further provides embodiments of application function realization devices and corresponding terminals.

Figure 11:
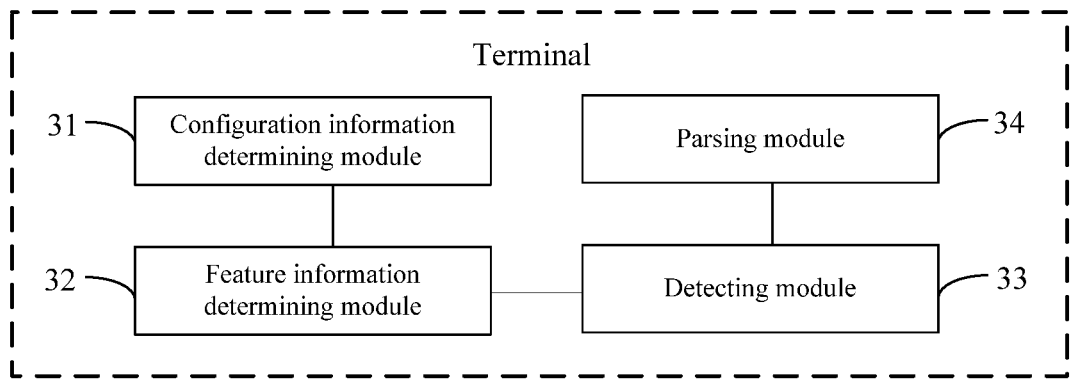
FIG. 11 is a device block diagram showing a terminal according to an exemplary embodiment of the present disclosure.

FIG. 11 is a device block diagram showing a terminal for transmitting a downlink hybrid automatic repeat request (HARQ) feedback information according to an exemplary embodiment, and referring to FIG. 11, the terminal may include a configuration information determining module 31, a feature information determining module 32, a detecting module 33 and a parsing module 34.

The configuration information determining module 31 is configured to determine preset downlink HARQ configuration information. The preset downlink HARQ configuration information is used for informing the terminal of transmission characteristics of a target downlink control signaling, and the target downlink signaling is used for bearing HARQ feedback information for at least two uplink data transmissions of any terminal.

In another terminal embodiment of the present disclosure, the configuration information determining module 31 may be configured to receive the preset downlink HARQ configuration information issued by the base station.

The feature information determining module 32 is configured to determine feature information of the target downlink control signaling according to the preset downlink HARQ configuration information.

In the present disclosure, the feature information of the target downlink control signaling includes at least one of the followings:
  preset bit length information for downlink HARQ feedback information of the terminal;
  preset flag information used for identifying the target downlink control signaling; and
  transmission characteristics information of the target downlink control signaling.

The transmission characteristics information includes at least one of the following:
  a preset time-frequency position for transmitting the target downlink control signaling;
  a preset HARQ-RNTI value; and
  a preset scrambling sequence of the target downlink control signaling.

The detecting module 33 is configured to acquire the target downlink control signaling of the terminal according to the feature information.

The parsing module 34 is configured to parse the target downlink control signaling to obtain the HARQ feedback information for the at least two uplink data transmissions.

Figure 12:
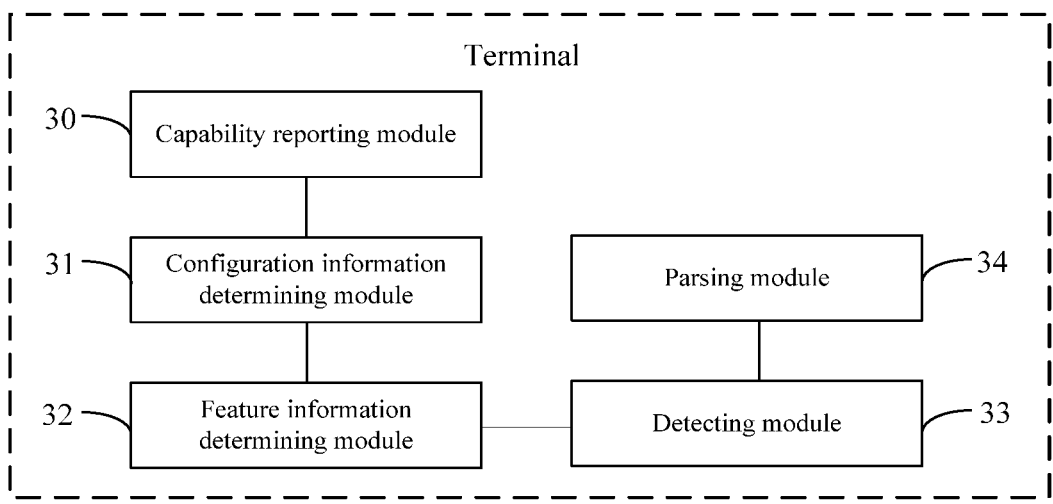
FIG. 12 is a device block diagram showing a terminal according to an exemplary embodiment of the present disclosure.

In another terminal embodiment of the present disclosure, if the downlink HARQ configuration information determined by the configuration information determining module 31 includes preset bit length information for downlink HARQ feedback information of the terminal, referring to FIG. 12 which is a device block diagram showing another terminal according to an exemplary embodiment, the terminal may further include a capability reporting module 30 based on the device embodiment shown in FIG. 11.

The capability reporting module 30 is configured to report device capability information of the terminal to the base station, and the device capability information indicates the number of HARQ feedback processes supported by the terminal, so that the base station determines the downlink HARQ configuration information according to the number of HARQ feedback processes supported by the terminal.

Figure 13:
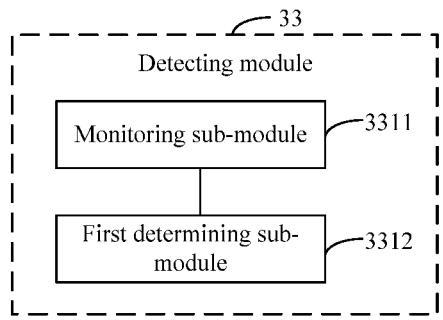
FIG. 13 is a device block diagram showing another terminal according to an exemplary embodiment of the present disclosure.

In another terminal embodiment of the present disclosure, the feature information of the target downlink control signaling includes preset bit length information for downlink HARQ feedback information of the terminal, referring to FIG. 13 which is a device block diagram showing another terminal according to an exemplary embodiment, the detecting module 33 may include the following submodules based on the device embodiment shown in FIG. 11:
  a monitoring sub-module 3311, configured to monitor downlink control information according to the preset bit length information; and
  a first determining sub-module 3312, configured to: in response to downlink control information conforming to the preset bit length being monitored, determine the downlink control information as the target downlink control signaling of the terminal.

Figure 14:
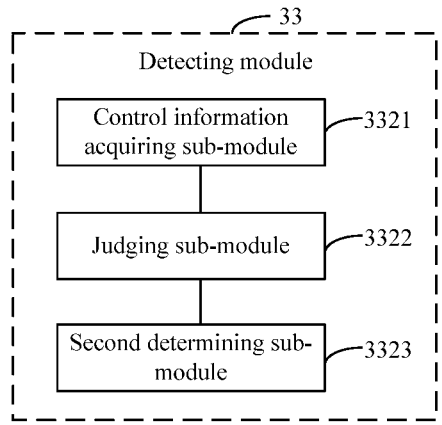
FIG. 14 is a device block diagram showing another terminal according to an exemplary embodiment of the present disclosure.

In another terminal embodiment of the present disclosure, the feature information of the target downlink control signaling includes the preset flag information corresponding to the target downlink control signaling, referring to FIG. 14 which is a device block diagram showing another terminal according to an exemplary embodiment, the detecting module 33 may include the following submodules based on the device embodiment shown in FIG. 11:

a control information acquiring sub-module 3321, configured to acquire downlink control information belonging to the terminal;

a judging sub-module 3322, configured to determine whether current downlink control information carries the preset flag information;

a second determining sub-module 3323, configured to: in response to determining that the current downlink control information carries the preset flag information, determine the current downlink control information as the target downlink control signaling.

Figure 15:
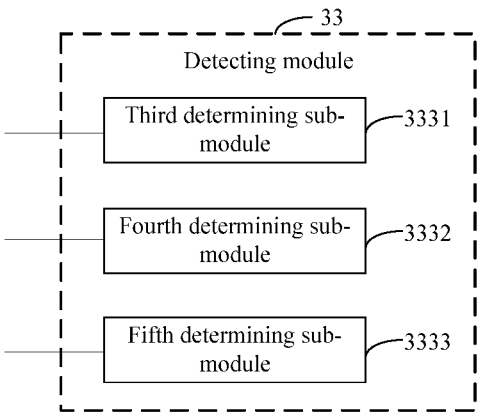
FIG. 15 is a device block diagram showing another terminal according to an exemplary embodiment of the present disclosure.

In another terminal embodiment of the present disclosure, the feature information of the target downlink control signaling includes the transmission characteristics information of the target downlink control signaling, referring to FIG. 15 which is a device block diagram showing another terminal according to an exemplary embodiment, the detecting module 33 may include at least one of the following sub-modules based on the device embodiment shown in FIG. 11:

a third determining sub-module 3331, configured to: in response to downlink control information belonging to the terminal being detected at a preset time-frequency position of a transmission unit, determine the downlink control information as the target downlink control signaling; and a fourth determining sub-module 3332, configured to: in response to downlink control information belonging to the terminal being monitored through the HARQ-RNTI value, determine the downlink control information as the target downlink control signaling; and a fifth determining sub-module 3333, configured to: in response to a detected downlink control information being successfully descrambled through the preset scrambling sequence, determine the downlink control information as the target downlink control signaling.

Figure 16:
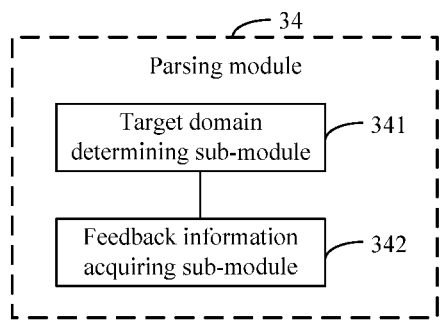
FIG. 16 is a device block diagram showing another terminal according to an exemplary embodiment of the present disclosure.

Referring to FIG. 16 which is a device block diagram showing another terminal according to an exemplary embodiment, based on the device embodiment shown in FIG. 11, the parsing module 34 may include a target domain determining sub-module 341 and a feedback information acquiring sub-module 342.

The target domain determining sub-module 341 is configured to determine a target information domain corresponding to each uplink data transmission according to the downlink HARQ configuration information. The target information domain is used for bearing HARQ feedback information for one preset uplink data transmission.

The feedback information acquiring sub-module 342 is configured to acquire the HARQ feedback information for individual uplink data transmissions from different information domains of the target downlink control signaling.

Figure 17:
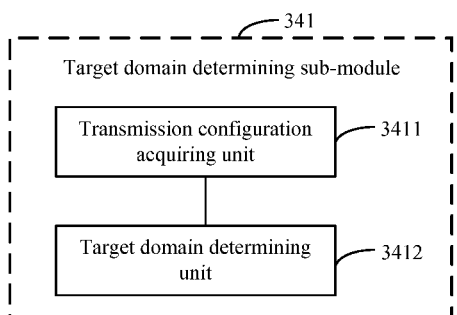
FIG. 17 is a device block diagram showing another terminal according to an exemplary embodiment of the present disclosure.

Referring to FIG. 17 which is a device block diagram of another terminal according to an exemplary embodiment, based on the device embodiment shown in FIG. 11, the target domain determining sub-module 341 may include a transmission configuration acquiring unit 3411 and a target domain determining unit 3412.

The transmission configuration acquiring unit 3411 is configured to acquire transmission configuration information of the HRAQ feedback information. The transmission configuration information of the HARQ feedback information is used for informing the terminal of bearing positions, in the target downlink control signaling, of the HARQ feedback information for the at least two uplink data transmissions.

The target domain determining unit 3412 is configured to determine the target information domain corresponding to each uplink data transmission according to the transmission configuration information of the HARQ feedback information.

Correspondingly, the present disclosure further provides a base station for transmitting a downlink hybrid automatic repeat request (HARQ) feedback information.

Figure 18:
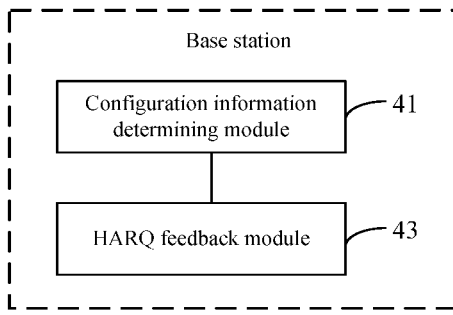
FIG. 18 is a device block diagram showing a base station according to an exemplary embodiment of the present disclosure.

FIG. 18 is a device block diagram of a base station according to an exemplary embodiment. Referring to FIG. 18, the base station may include a configuration information determining module 41 and a HARQ feedback module 43.

The configuration information determining module 41 is configured to determine preset downlink HARQ configuration information. The preset downlink HARQ configuration information is used for informing a terminal of transmission characteristics of a target downlink control signaling, and the target downlink control signaling is used for bearing HARQ feedback information for at least two uplink data transmissions of one terminal.

In a base station embodiment of the present disclosure, the downlink HARQ configuration information determined by the configuration information determining module 41 may include feature information of the target downlink control signaling. The feature information is used for informing the terminal how to identify the target downlink control signaling.

In a base station embodiment of the present disclosure, the feature information includes at least one of the following:

preset bit length information for downlink HARQ feedback information of the terminal;

preset flag information used for identifying the target downlink control signaling; and transmission characteristics information of the target downlink control signaling.

The transmission characteristics information includes at least one of the following:

a preset time-frequency position for transmitting the target downlink control signaling;

a preset HARQ-RNTI value; and a preset scrambling sequence of the target downlink control signaling.

The HARQ feedback module 43 is configured to: load the HARQ feedback information into the target downlink control signaling according to the preset downlink HARQ configuration information, and send the target downlink control signaling to the terminal.

Figure 19:
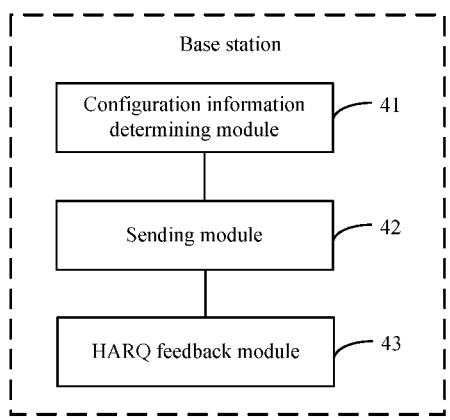
FIG. 19 is a device block diagram showing another base station according to an exemplary embodiment of the present disclosure.

Referring to FIG. 19 which is a device block diagram showing a base station according to an exemplary embodiment, on the basis of the device embodiment shown in FIG. 18, the base station may further include:

a sending module 42, configured to send the preset downlink HARQ configuration information to the terminal, so that the terminal learns the target downlink control signaling according to the preset downlink HARQ configuration information.

Figure 20:
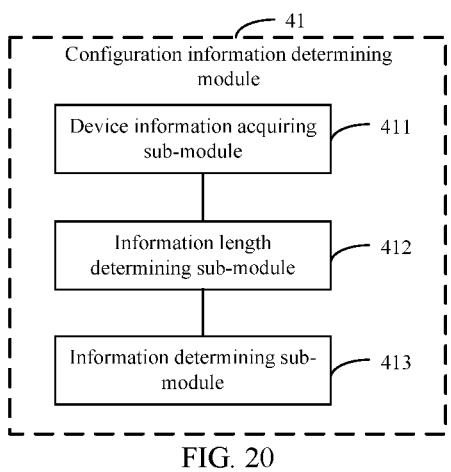
FIG. 20 is a device block diagram showing another base station according to an exemplary embodiment of the present disclosure.

Referring to FIG. 20 which is a device block diagram showing a base station according to an exemplary embodiment, on the basis of the device embodiment shown in FIG. 18, the configuration information determining module 41 may include a device information acquiring sub-module 411, an information length determining sub-module 412 and an information determining sub-module 413.

The device information acquiring sub-module 411 is configured to acquire device capability information of the terminal. The device capability information indicates the number of HARQ feedback processes supported by the terminal.

The information length determining sub-module 412 is configured to determine the preset bit length information of the target downlink control signaling according to the number of HARQ feedback processes supported by the terminal.

The information determining sub-module 413 is configured to determine the downlink HARQ configuration information according to the preset bit length information.

In another base station embodiment of the present disclosure, the downlink HARQ configuration information determined by the configuration information determining module 41 may also include: transmission configuration information of the HARQ feedback information, and the transmission configuration information of the HARQ feedback information is used for informing the terminal of bearing positions, in the target downlink control signaling, of the HARQ feedback information for the at least two uplink data transmissions.

The HARQ feedback module may be configured to load the HARQ feedback information for the at least two uplink data transmissions into a designated information domain of the target downlink control signaling according to the transmission configuration information.

Since the device embodiments substantially correspond to the method embodiments, the relevant parts thereof can be referred to the description of the method embodiments. The device embodiments described above are only exemplary. The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments. Those of ordinary skill in the art can understand and implement without paying creative labor Correspondingly, an aspect provides a terminal, including:
 a processor; and
 a memory for storing instructions executable by the processor;
 and the processor is configured to:
 determine preset downlink HARQ configuration information, and the preset downlink HARQ configuration information is used for informing the terminal of transmission characteristics of a target downlink control signaling, and the target downlink signaling is used for bearing HARQ feedback information for at least two uplink data transmissions of any terminal;
 determine feature information of the target downlink control signaling according to the preset downlink HARQ configuration information;
 acquire the target downlink control signaling of the terminal according to the feature information; and
 parse the target downlink control signaling to obtain the HARQ feedback information for the at least two uplink data transmissions.

Another aspect provides a base station, including:
 a processor; and
 a memory for storing instructions executable by the processor;
 and the processor is configured to:
 determine preset downlink HARQ configuration information, and the preset downlink HARQ configuration information is used for informing a terminal of transmission characteristics of a target downlink control signaling, and the target downlink control signaling is used for bearing HARQ feedback information for at least two uplink data transmissions of any terminal; and
 load the HARQ feedback information into the target downlink control signaling according to the preset downlink HARQ configuration information, and send the target downlink control signaling to the terminal.

Figure 21:
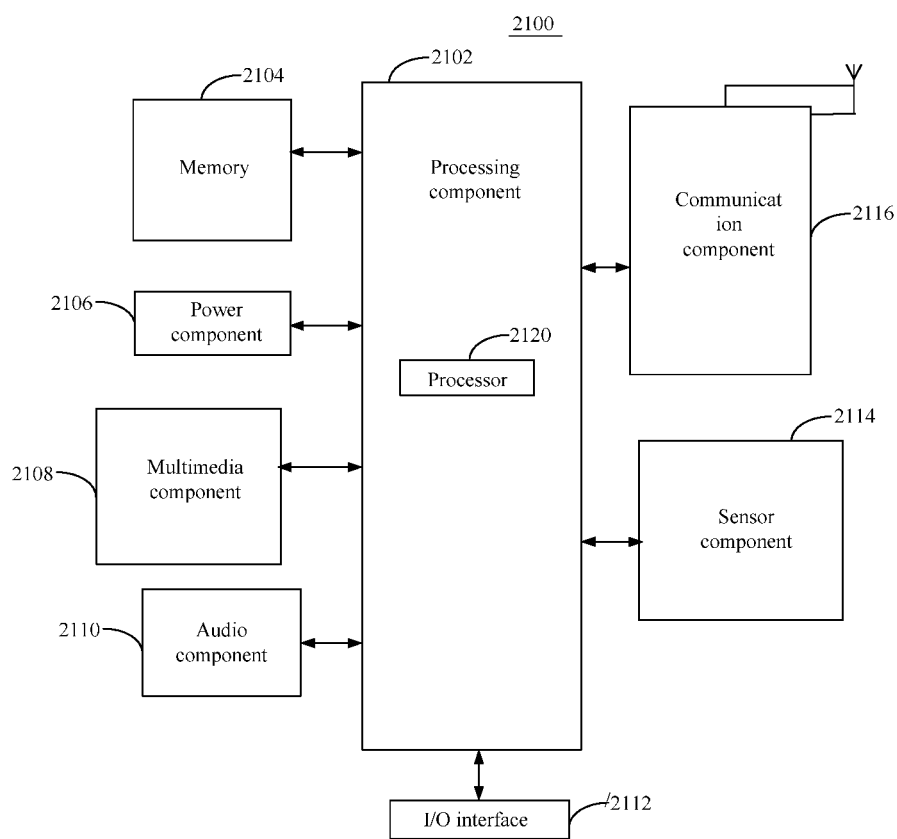
FIG. 21 is a schematic structural diagram showing a terminal according to an exemplary embodiment of the present disclosure.

FIG. 21 is a schematic structural diagram showing a terminal 2100 according to an exemplary embodiment. For example, the terminal 2100 may be a user equipment, which may specifically be a mobile phone, a computer, a digital broadcasting terminal, a messaging device, a game console, a tablet device, a medical device, a fitness device, a personal digital assistant, and a wearable device such as a smart watch, a smart glasses, a smart bracelet, smart running shoes, etc.

Referring to FIG. 21, the terminal 2100 may include one or more of the following components: a processing component 2102, a memory 2104, a power component 2106, a multimedia component 2108, an audio component 2110, an input/output (I/O) interface 2112, a sensor component 2114, and a communication component 2116.

The processing component 2102 typically controls the overall operations of the terminal 2100, such as the operations associated with display, telephone calls, data communications, camera operations, and recording operations. The processing component 2102 can include one or more processors 2120 to execute instructions to perform all or part of the steps in the above described methods. Moreover, the processing component 2102 can include one or more modules to facilitate the interaction between the processing component 2102 and other components. For example, the processing component 2102 can include a multimedia module to facilitate the interaction between the multimedia component 2108 and the processing component 2102.

The memory 2104 is configured to store various types of data to support the operation of the terminal 2100. Examples of such data include instructions for any application or method operated on device 2100, such as the contact data, the phone book data, messages, pictures, videos, and the like. The memory 2104 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 provides power to various components of the terminal 2100. The power component 2106 can include a power management system, one or more power sources, and other components associated with the generation, management, and distribution of power in the terminal 2100.

The multimedia component 2108 includes a screen providing an output interface between the terminal 2100 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2108 includes a front camera and/or a rear camera. When the terminal 2100 is in an operation mode, such as a photographing mode or a video mode, the front camera and/or the rear camera can receive external multimedia data. Each of the front camera and the rear camera may be a fixed optical lens system or have focus and optical zoom capability.

The audio component 2110 is configured to output and/or input an audio signal. For example, the audio component 2110 includes a microphone (MIC) configured to receive an external audio signal when the terminal 2100 is in an operation mode, such as a call mode, a recording mode, and a voice recognition mode. The received audio signal may be further stored in the memory 2104 or sent via the communication component 2116. In some embodiments, the audio component 2110 also includes a speaker for outputting the audio signal.

The I/O interface 2112 provides an interface between the processing component 2102 and peripheral interface modules, such as a keyboard, a click wheel, buttons, and the like. These buttons may include, but are not limited to, a home button, a volume button, a starting button, and a locking button.

The sensor component 2114 includes one or more sensors for providing status assessments of various aspects of the terminal 2100. For example, the sensor component 2114 can detect an open/closed status of the terminal 2100, relative positioning of components, such as the display and the keypad of the terminal 2100. The sensor component 2114 can also detect a change in position of one component of the terminal 2100 or the terminal 2100, the presence or absence of user contact with the terminal 2100, an orientation, or an acceleration/deceleration of the terminal 2100, and a change in temperature of the terminal 2100. The sensor component 2114 can include a proximity sensor configured to detect the presence of nearby objects without any physical contact. The sensor component 2114 can also include a light sensor, such as a CMOS or CCD image sensor, configured to use in imaging applications. In some embodiments, the sensor component 2114 can also include an accelerometer sensor, a gyroscope sensor, a magnetic sensor, a pressure sensor, or a temperature sensor.

The communication component 2116 is configured to facilitate wired or wireless communication between the terminal 2100 and other devices. The terminal 2100 can access a wireless network based on a communication standard, such as WiFi, 2G or 3G, or a combination thereof. In an exemplary embodiment, the communication component 2116 receives broadcast signals or broadcast associated information from an external broadcast management system via a broadcast channel. In an exemplary embodiment, the communication component 2116 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the terminal 2100 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including instructions, such as a memory 2104 including instructions executable by the processor 2120 of the terminal 2100 to complete the method for transmitting HARQ feedback information described in any one of FIGS. 1 to 6. For example, the non-transitory computer readable storage medium may be a ROM, a random access memory (RAM), a CD-ROM, a magnetic tape, a floppy disc, and an optical data storage device.

Figure 22:
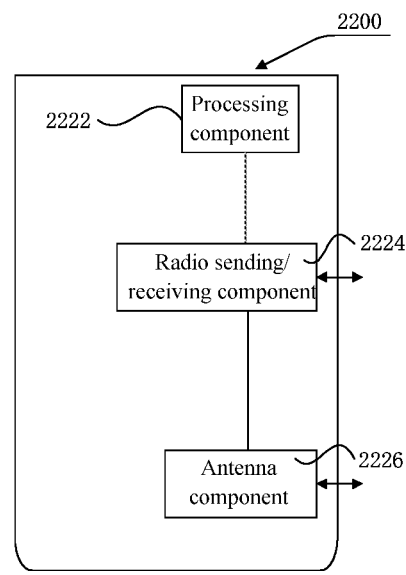
FIG. 22 is a schematic structural diagram showing a base station according to an exemplary embodiment of the present disclosure.

As shown in FIG. 22, FIG. 22 is a schematic structural diagram showing a base station 2200 according to an exemplary embodiment. Referring to FIG. 22, the base station 2200 includes a processing component 2222, a radio sending/receiving component 2224, an antenna component 2226, and a signal processing part specific to the radio interface. The processing component 2222 may further include one or more processors.

One of the processors in the processing component 2222 may be configured to:
  determine preset downlink HARQ configuration information, where the preset downlink HARQ configuration information is used for informing a terminal of transmission characteristics of a target downlink control signaling, and the target downlink control signaling is used for bearing HARQ feedback information for at least two uplink data transmissions of one terminal; and
  load the HARQ feedback information into the target downlink control signaling according to the preset downlink HARQ configuration information, and send the target downlink control signaling to the terminal.

In an exemplary embodiment, there is also provided a non-transitory computer-readable storage medium including instructions, and computer instructions are stored thereon, which can be executed by the processing component 2222 of the base station 2200 to complete the method for transmitting HARQ feedback information described in any one of FIGS. 7 to 9. For example, the non-transitory computer readable storage medium may be a ROM, a random access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for transmitting hybrid automatic repeat request (HARQ) feedback information, comprising:
  acquiring, by a terminal, preset downlink HARQ configuration information, wherein the preset downlink HARQ configuration information is used for informing the terminal of transmission characteristics of a target downlink control signaling, and the target downlink control signaling is used for bearing HARQ feedback information for at least two uplink data transmissions of any terminal;
  determining, by the terminal, feature information of the target downlink control signaling according to the preset downlink HARQ configuration information;

acquiring, by the terminal, the target downlink control signaling of the terminal according to the feature information; and parsing, by the terminal, the target downlink control signaling to obtain the HARQ feedback information for the at least two uplink data transmissions, wherein parsing, by the terminal, the target downlink control signaling to obtain the HARQ feedback information for the at least two uplink data transmissions comprises:

determining, by the terminal, a target information domain corresponding to each uplink data transmission according to the preset downlink HARQ configuration information, wherein the target information domain is configured for bearing the HARQ feedback information for a preset uplink data transmission; and acquiring, by the terminal, the HARQ feedback information for each uplink data transmission from different information domains of the target downlink control signaling.

2. The method according to claim 1, wherein acquiring, by the terminal, the preset downlink HARQ configuration information comprises:

receiving, by the terminal, the preset downlink HARQ configuration information issued by a base station.

3. The method according to claim 2, wherein the feature information of the target downlink control signaling comprises the preset bit length information for the HARQ feedback information of the terminal, and the method further comprises: before receiving, by the terminal, the preset downlink HARQ configuration information issued by the base station, reporting, by the terminal, device capability information of the terminal to the base station, wherein the device capability information indicates a number of HARQ feedback processes supported by the terminal, wherein the base station determines the preset downlink HARQ configuration information according to the number of HARQ feedback processes supported by the terminal.

4. The method according to claim 1, wherein the feature information of the target downlink control signaling comprises at least one of following information:

preset bit length information for the HARQ feedback information of the terminal;

preset flag information used for identifying the target downlink control signaling; and transmission characteristics information of the target downlink control signaling.

5. The method according to claim 4, wherein the transmission characteristics information comprises at least one of following parameters:

a preset time-frequency position for transmitting the target downlink control signaling;

a preset HARQ radio network temporary identifier (HARQ-RNTI) value; and a preset scrambling sequence of the target downlink control signaling.

6. The method according to claim 5, wherein the feature information of the target downlink control signaling comprises the transmission characteristics information of the target downlink control signaling; and wherein acquiring, by the terminal, the target downlink control signaling of the terminal according to the feature information comprises at least one of followings:

in response to detecting downlink control information belonging to the terminal at the preset time-frequency position of a transmission unit, determining, by the terminal, the downlink control information as the target downlink control signaling; and in response to detecting the downlink control information belonging to the terminal by using the HARQ-RNTI value, determining, by the terminal, the downlink control information as the target downlink control signaling; and in response to successfully descrambling the detected downlink control information by using the preset scrambling sequence, determining, by the terminal, the downlink control information as the target downlink control signaling.

7. The method according to claim 4, wherein the feature information of the target downlink control signaling comprises the preset bit length information for the HARQ feedback information of the terminal, and wherein acquiring, by the terminal, the target downlink control signaling of the terminal according to the feature information comprises:

monitoring, by the terminal, downlink control information according to the preset bit length information; and in response to detecting the downlink control information conforming to the preset bit length, determining, by the terminal, the downlink control information as the target downlink control signaling of the terminal.

8. The method according to claim 4, wherein the feature information of the target downlink control signaling comprises the preset flag information corresponding to the target downlink control signaling; and wherein acquiring, by the terminal, the target downlink control signaling of the terminal according to the feature information comprises:

acquiring, by the terminal, downlink control information belonging to the terminal;

determining, by the terminal, whether the downlink control information carries the preset flag information; and determining, by the terminal, the downlink control information as the target downlink control signaling in response to determining that the downlink control information carries the preset flag information.

9. The method according to claim 1, wherein determining, by the terminal, the target information domain corresponding to each uplink data transmission according to the preset downlink HARQ configuration information comprises:

acquiring, by the terminal, transmission configuration information of the HRAQ feedback information, wherein the transmission configuration information of the HARQ feedback information is configured for informing the terminal of bearing positions of the HARQ feedback information for the at least two uplink data transmissions, and the bearing positions are in the target downlink control signaling; and determining, by the terminal, the target information domain corresponding to each uplink data transmission according to the transmission configuration information of the HARQ feedback information.

10. A method for transmitting downlink hybrid automatic repeat request (HARQ) feedback information, comprising:

determining, by a base station, preset downlink HARQ configuration information, wherein the preset downlink HARQ configuration information is used for informing a terminal of transmission characteristics of a target downlink control signaling, and the target downlink control signaling is used for bearing HARQ feedback information for at least two uplink data transmissions of any terminal; and loading, by the base station, the HARQ feedback information into the target downlink control signaling according to the preset downlink HARQ configuration information, and sending, by the base station, the target downlink control signaling to the terminal, wherein the HARQ feedback information for each uplink data transmission is acquired by the terminal from different information domains of the target downlink control signaling, the target information domain is configured for bearing the HARQ feedback information for a preset uplink data transmission, and a target information domain corresponding to each uplink data transmission is determined according to the preset downlink HARQ configuration information.

11. The method according to claim 10, further comprising:
sending, by the base station, the preset downlink HARQ configuration information to the terminal, so that the terminal learns the target downlink control signaling according to the preset downlink HARQ configuration information.

12. The method according to claim 10, wherein the downlink HARQ configuration information comprises feature information of the target downlink control signaling, and the feature information is used for informing the terminal how to identify the target downlink control signaling.

13. The method according to claim 12, wherein the feature information comprises at least one of following information:
preset bit length information for the HARQ feedback information of the terminal;
preset flag information used for identifying the target downlink control signaling; and
transmission characteristics information of the target downlink control signaling.

14. The method according to claim 13, wherein the transmission characteristics information comprises at least one of following parameters:
a preset time-frequency position for transmitting the target downlink control signaling;
a preset HARQ radio network temporary identifier (HARQ-RNTI) value; and
a preset scrambling sequence of the target downlink control signaling.

15. The method according to claim 13, wherein the feature information comprises the preset bit length information for the HARQ feedback information of the terminal; and
wherein determining, by the base station, the preset downlink HARQ configuration information comprises:
acquiring, by the base station, device capability information of the terminal, wherein the device capability information indicates a number of HARQ feedback processes supported by the terminal;
determining, by the base station, the preset bit length information of the target downlink control signaling according to the number of HARQ feedback processes supported by the terminal; and
determining, by the base station, the downlink HARQ configuration information according to the preset bit length information.

16. The method according to claim 12, wherein the downlink HARQ configuration information further comprises transmission configuration information of the HARQ feedback information, and the transmission configuration information of the HARQ feedback information is used for informing the terminal of bearing positions of the HARQ feedback information for the at least two uplink data transmissions and the bearing positions are in the target downlink control signaling; and
wherein loading the HARQ feedback information into the target downlink control signaling according to the downlink HARQ configuration information comprises:
loading the HARQ feedback information for the at least two uplink data transmissions into a designated information domain of the target downlink control signaling according to the transmission configuration information.

17. A terminal, comprising:
a processor; and
a memory for storing instructions executable by the processor;
wherein the processor is configured to:
acquire preset downlink hybrid automatic repeat request (HARQ) configuration information, wherein the preset downlink HARQ configuration information is used for informing the terminal of transmission characteristics of a target downlink control signaling, and the target downlink control signaling is used for bearing HARQ feedback information for at least two uplink data transmissions of any terminal;
determine feature information of the target downlink control signaling according to the preset downlink HARQ configuration information;
acquire the target downlink control signaling of the terminal according to the feature information; and
parse the target downlink control signaling to obtain the HARQ feedback information for the at least two uplink data transmissions,
wherein the processor is further configured to:
determine a target information domain corresponding to each uplink data transmission according to the preset downlink HARQ configuration information, wherein the target information domain is configured for bearing the HARQ feedback information for a preset uplink data transmission; and
acquire the HARQ feedback information for each uplink data transmission from different information domains of the target downlink control signaling.

18. A base station, comprising:
a processor; and
a memory for storing instructions executable by the processor;
wherein the processor is configured to:
determine preset downlink hybrid automatic repeat request (HARQ) configuration information, wherein the preset downlink HARQ configuration information is used for informing a terminal of transmission characteristics of a target downlink control signaling, and the target downlink control signaling is used for bearing HARQ feedback information for at least two uplink data transmissions of any terminal; and
load the HARQ feedback information into the target downlink control signaling according to the preset downlink HARQ configuration information, and send the target downlink control signaling to the terminal,
wherein the HARQ feedback information for each uplink data transmission is acquired by the terminal from different information domains of the target downlink control signaling, the target information domain is configured for bearing the HARQ feedback information for a preset uplink data transmission, and a target information domain corresponding to each uplink data transmission is determined according to the preset downlink HARQ configuration information.

\* \* \* \* \*